United States Patent Office 2,838,445
Patented June 10, 1958

2,838,445

REFORMING PROCESS AND CATALYST

John W. Teter, deceased, late of Chicago, Ill., by Ruth Young Teter, administratrix, Chicago, Ill., Carl D. Keith, Munster, Ind., and John L. Gring, Homewood, Ill., assignors to Engelhard Industries, Inc., a corporation of New Jersey No Drawing. Application April 27, 1956
Serial No. 581,250

4 Claims. (Cl. 196—50)

This invention relates to an improved reforming catalyst comprising alumina and a platinum metal. The new catalyst is characterized by unique base structure essentially determined by a particular precursor alumina composition and by having in the virgin state substantially no pores of radius less than 10 angstrom units. The invention further relates to the application of the new catalyst in the reforming of light hydrocarbon stocks to produce gasoline of enhanced octane value, benzene and other selected aromatics such as toluene or xylene.

In application Serial Nos. 288,058, filed May 15, 1952, now abandoned, and 489,726, filed February 21, 1955, we described a regenerable catalyst which has been employed commercially by several refiners to reform petroleum naphthas. The catalyst contains a small amount of a platinum metal in finely dispersed form on an alumina base essentially comprised of gamma-alumina modifications derived from a precursor alumina hydrate composition which predominates in trihydrate alumina. Usually about 65 to 95 weight percent of the precursor hydrate is trihydrate comprising one or more of the gibbsite, bayerite and randomite (bayerite–II) forms as determined by X-ray diffraction analysis. The substantial balance of the precursor hydrous alumina composition is composed of amorphous hydrous alumina or a form corresponding after drying to monohydrate, e. g. boehmite, or a mixture of these forms. The trihydrates are present as well-defined crystallites when examined by X-ray diffraction means. The calcined catalyst in the virgin state is characterized by high surface area ranging from about 350 to about 550 or more square meters per gram as determined by the BET adsorption technique. The catalyst also has a large part of its pore volume (determined from desorption isotherms for nitrogen by the method of Barrett, Joyner and Halenda, JACS 73, 373 (1951)) in pores ranging in size from about 100 to about 1000 angstrom units radius, generally having about 0.1 to about 0.5, preferably from about 0.15 to about 0.3, cc./gram of pore volume in pores of this size. The crystallite size of the precursor alumina trihydrate also is relatively large and usually approximates the 100 to 1000 angstrom unit range. This catalyst is employed commercially by several refiners for reforming petroleum naphthas in units which dispose the catalyst as a fixed bed and periodically reactivate the catalyst by regeneration techniques including the removal of carbonaceous deposit from the catalyst through burning in the presence of an oxygen-containing gas.

As noted above, the catalyst of our copending applications has, when in the virgin state, a high surface area, e. g. about 350 to 550 or more square meters per gram, due to the presence of small pores, and this characteristic we considered essential to its performance as an excellent reforming catalyst. Contrary to this belief, it has been found that an excellent regenerable platinum metal-alumina reforming catalyst can be prepared by the drying and calcination of the catalyst base precursor defined in our previous applications to obtain relatively low area gamma-alumina modifications wherein the final catalyst has substantially no pores of less than 10 angstrom units radius, preferably substantially no pores of less than about 15 angstrom units radius, as determined by the method of Barrett, Joyner and Halenda. This new catalyst has a surface area of less than about 350 square meters per gram, and most advantageously the area is in the range of about 150 to 300 square meters per gram.

When our previous catalyst containing a substantial number of pores of less than 10 angstrom units radius is employed in commercial reforming operations, several disadvantages tend to accrue. As this catalyst is carried through its processing and regenerating cycles it loses surface area and becomes physically weaker. In commercial fixed bed operations the physical strength of the catalyst which is generally of macrosize must be sufficient to avoid substantial breakage of particles under the weight of the catalyst disposed above a given particle in the bed. Otherwise, as the particles crumble the voids in the bed become clogged and the pressure drop through the bed can become so great that practical operation of the unit is impaired. The catalyst of the present invention is appreciably more stable physically and thus during its use in the reforming operation retains sufficient physical strength to minimize pressure drop troubles. Our present catalyst may be slightly weaker than our previous catalyst in the virgin state but in respect of this property is more stable and so maintains a strength level substantially above that of our mentioned commercial catalyst after its extended use in the reforming operation. The stability of our present catalyst is particularly advantageous in high severity reforming operations which produce high octane reformate and which require more frequent regeneration of the catalyst than is necessary when operating to obtain a product of lower octane.

We now believe that the life of our previous catalyst is a direct function of the amount of platinum available in the immediate area of its large pores. Thus, we now believe that any platinum metal deposited in small pores tends to become inaccessible and ineffective towards providing catalytic action in the reforming reactions. Small pores are provided during calcination of the hydrated base material and possibly some platinum is transferred to these pores during calcination when a flowing oxygen-containing gas stream is employed. Furthermore, in the initial cycles of the regenerative reforming process, we believe that additional portions of platinum migrate to the small pores while the catalyst is in contact with free oxygen-containing gases during regeneration. Subsequently during the reforming operation the small pores of the catalysts are closed and any platinum metal in these pores becomes trapped and unavailable to the naphtha feed. Even if the small pores are not closed any platinum metal therein tends to become unavailable to the naphtha since the feed and the reaction products have difficulty entering and leaving the pores, which movements are essential in obtaining effective catalytic action. Additionally, carbonaceous materials deposited on the catalyst during reforming more easily clog small pores to make the platinum in these pores inaccessible to the naphtha feed. Thus the platinum metal in the small pores becomes ineffective and the activity and life of the catalyst are disadvantageously affected. Since our present catalyst contains substantially no pores of less than 10 angstrom units radius, there is greater opportunity for making a maximum amount of the platinum available in the immediate area of the large pores.

The present commercial trend is towards reforming under conditions of increasing severity in order to prepare reformate of higher octane number. As severity increases, the platinum metal-alumina catalyst becomes deactivated in shorter processing times, and this increased rate of deactivation necessitates more frequent regeneration of the catalyst. As the platinum metal catalyst undergoes successive regenerations, the activity level to which it can be carried generally decreases. This effect may be counteracted somewhat by increasing the amount of platinum metal in the catalyst; however, this is costly. Our present catalyst is effective in high severity reforming operations apparently due to its low ratio of small pores. Thus, even with frequent catalyst regenerations, there is less chance for platinum to be made inaccessible to the naphtha feed undergoing reforming. For this reason, more of the platinum in our present catalyst tends to be made available over a number of cyclic processing-regeneration periods as encountered particularly in high severity reforming operations.

We have also found that the amount of carbonaceous materials deposited on our present catalyst during reforming is materially less than that with the catalyst of our cited applications. This is particularly advantageous since as a result there will be less processing downtime necessary to maintain the catalyst in satisfactorily active form as there will be less carbonaceous deposits to remove from the catalyst for a given processing period.

Thus when using a catalyst prepared in accordance with the present invention the refiner is assured that the platinum metal will remain available in the large pores of the catalyst and not be transferred to more unavailable small pores. We also provide a virgin catalyst which is of good strength and of good physical stability during use in cyclic reforming operations which include periodic regenerations. Further, the amount of carbonaceous materials deposited on our new catalyst during reforming is materially decreased which decreases regeneration downtime necessary to maintain the catalyst in a satisfactorily active state.

The catalyst of the present invention is advantageously prepared by initially calcining the alumina hydrate precursor in a manner to provide a sintered product or by sintering the calcined virgin high area catalyst of our previous applications. When initially calcining the hydrate to obtain the sintered product, we have not determined whether or not the catalyst passes through a distinct high area state. In any event, we prefer to sinter the catalyst composition during the initial calcination of the alumina hydrate since subsequent sintering of the high area base tends to provide somewhat physically weaker catalyst particles. It is usually disadvantageous from an economic standpoint to calcine the catalyst twice as is necessary where the high area base is produced in a distinct operation and then sintered. Also, when initially calcining in a free oxygen-containing atmosphere to obtain the high area catalyst, there is a likelihood of moving platinum to the small pores where upon subsequent sintering of the base by additional calcination the small pores are closed to make their platinum inaccessible. When calcining the alumina hydrate initially to a low area the small pores may close before the platinum migrates to these pores even though an oxygen-containing gas is employed during the calcination.

In preparing the catalyst of our present invention the alumina hydrate precursor can be made, among other ways, as set forth in our mentioned applications. Thus our new catalyst can be made by forming an alumina hydrogel; converting the alumina hydrogel, which as formed is a highly gelatinous precipitate composed of a mixture of amorphous gelatinous hydrous oxides that normally dry to boehmite or an amorphous appearing alumina hydrate, to a mixture predominating in crystalline trihydrate; incorporating the platinum metal-bearing component and, if desired, a promoter in the mixture of hydrate phases; drying the resulting slurry; and calcining the dried product so that the catalyst contains substantially no pores of less than 10 angstrom units radius. Usually, the composition is tabletted or extruded into the particular form desired prior to calcination, but if desired, calcination can be accomplished prior to forming the larger particles. Also, the platinum metal can be incorporated after the hydrate is sintered to the low area base, and in this instance the catalyst particles would usually be recalcined. In preparing the composition relatively pure reagents and special corrosion resistant handling equipment are advantageously used to avoid contamination, e. g. with iron.

When the catalyst is prepared by this procedure, the alumina hydrogel is formed by precipitating the gelatinous hydrous oxide from a solution of a soluble aluminum salt such as aluminum chloride. Other soluble sources of aluminum can be employed, for example aluminum sulfate or sodium aluminate, although subsequent removal of sulfate ion, for example, by washing may occasion more difficulty than chloride ion. Ammonium hydroxide is a useful agent for precipitation of the alumina hydrogel from the aluminum chloride solution. In the gel-forming step pH control is important in obtaining a good rate of conversion to trihydrate, and it is desirable to maintain a pH between about 7 to about 10. For instance, if the pH is too low, the conversion may be inhibited. As an incident to the gel-forming step, extraneous ions introduced in preparation such as chloride ion are removed by washing with water. For example, it is usually desirable to reduce chloride ion in the hydrogel to a concentration of about 0.2% or less.

The conversion of the alumina hydrogel to the desired precursor alumina system may be effected in various ways as by aging the hydrogel which is maintained at a pH of about 7 to about 10 for a period of several days, or as by seeding the hydrogel in the preparation process with crystallites of gibbsite, for example. The transition to the desired phase system predominating in the crystalline trihydrate forms of alumina may be roughly controlled with experience by visual observation. The translucent hydrogel takes on a decidedly whiter and more opaque appearance as the crystallites form and cause light scattering. However, it is desirable to control the transition by sampling, drying the sample to say about 110 to 120° C. and determining the distribution of hydrate phases by the technique of X-ray diffraction analysis. By this means, the preparation procedure with given materials, operating techniques and equipment may be standardized and then may be controlled as seems necessary with spot analytical checks.

The crystalline trihydrate phase is the predominant part, preferably about 65 to about 95 weight percent, of the catalyst base precursor and the trihydrate phase contains one or more forms corresponding to the well-known hydrate forms gibbsite and bayerite and a third form which has been termed randomite or bayerite–II. The presence in the precursor mixture of a minor amount, at least about 5% and preferably from about 5 to about 35%, of a hydrate either in the form of amorphous, gelatinous, hydrated alumina or in a form corresponding after drying to monohydrate, e. g. boehmite, or mixtures of these forms, is essential in producing the desirable catalyst of this invention. The amorphous and boehmite forms can be provided in the precursor material either by separate addition or by control of the hydrate aging. When bayerite or randomite is present in the alumina hydrate, eta-alumina has been found in the calcined catalyst.

The resulting precursor alumina base compositions show in the dried structure by X-ray analysis a characteristic crystalline or quasi-crystalline appearance having a high proportion of accessible pore volume in the form of large pores in contrast to the amorphous character and small pore structure of alumina hydrates as frequently employed in catalyst preparation. It is preferred that the precursor alumina compositions should be essentially constituted of minute crystallites as evaluated by X-ray diffraction techniques on samples dried at approximately 110° C. Crystallites of about 1000 angstrom units or less are indicated. Sometimes when observing the dried samples under an electron microscope there appear to be particles of sizes greater than 1000 angstrom units. Since by X-ray diffraction these sizes are not indicated, these larger particles might be composed of separate crystallites. If the larger sizes constitute only a minor portion of the total sample, then it might be that their presence as single crystallites is not indicated by X-ray diffraction since this technique determines the average crystallite size on the basis that particle sizes above 1000 angstrom units are considered as 1000 units.

The catalysts made from aluminas containing high percentages of the crystalline trihydrates in the precursor alumina mixtures have considerable pore volume in the 100 to 1000 angstrom units pore size range. The catalyst of our invention generally has about 0.10 to about 0.5 and preferably about 0.15 to about 0.3 cc./gram of its pore volume in pores greater than about 100 angstrom units pore size. These large pores are not formed during calcination but actually exist in the dried uncalcined alumina trihydrate.

A catalyst of high activity and aging stability may be prepared from the alumina precursor base composition and platinum or other platinum-type metal having reforming activity, either alone or in the form of mixtures of the platinum metals. The useful metals include, besides platinum, rhodium, palladium and iridium. These are the face centered cubic crystalline types of the platinum family as distinct from the hexagonal types, ruthenium and osmium, which appear to be of lesser value. Where some hydrocracking to enhance octane number is desirable, the incorporation of an acidic promoter can be effected.

The platinum may be incorporated in the catalyst base by adding an aqueous solution of chloroplatinic acid, for example, to the precursor alumina composition followed by precipitation in situ through contact with an aqueous hydrogen sulfide solution or by hydrogen sulfide added as a gas. Another method of platinum incorporation is to admix a platinum sulfide sol of desired concentration with the precursor alumina composition. The resulting slurry in any case is dried, and preferably, the drying operation is conducted rapidly. For example, the drying can be completed in about 24 hours at about a pH of 6 to 9. Various expedients may be applied to accelerate drying by exercising appropriate precautions. For example, the mixture may be dried using a rotary drum type drier, or it may be pre-filtered to reduce water content and chloride content prior to drying in an oven, or it may be dried using a drum drier after reslurrying, or it may be spray dried. If desired, the platinum may be incorporated into the aged hydrate base after the base has been dried. Alternatively, the aged hydrate base may be impregnated with platinum after drying and partial to complete removal of water of crystallization or after sintering. However, an advantageous method is that which includes impregnation of the base before drying and sintering.

The catalyst compositions of our invention contain about 0.1 to about 1.5 or more weight percent of platinum or other platinum metal or combination of platinum metals. The form in which the platinum metal is present is not certain except that it is not detectable in the catalyst by X-ray diffraction methods. Thus, if the platinum metal be present as metal crystallites the fact that they are not detectable by X-ray diffraction methods indicates crystallite sizes of less than about 50 angstrom units. A surprising property of the finely dispersed platinum is that it is dissolved to a substantial extent in strong sulfuric acid. This observation suggests that the active platinum may be in some combined form or as very small crystallite rather than in the form of macro-metallic platinum particles. Excess platinum metal in forms detectable or undetectable by X-ray diffraction techniques may be present but has not been found to provide any advantage justifying the expense.

The dried alumina hydrate mixture may be formed by a tabletting or extruding operation to obtain macrosize particles for use in fixed bed reforming operations. These particles are generally from about $\frac{1}{16}''$ to about $\frac{1}{4}''$ in diameter and about $\frac{1}{16}''$ to $1''$ or more in length. If the catalyst is to be used in finely divided form a grinding operation may precede or follow calcination or the dried particles may be calcined without being formed into macrosize particles and used as such or they may be ground previous to calcination. In the case of tabletting, it is customary to incorporate a die lubricant which advantageously is organic and can be burned out by oxidation in the calcination step when an oxygen-containing gas is employed.

As indicated the catalyst base of this invention can be provided by calcining the alumina hydrate precursor under sintering conditions to provide particles having substantially no pores less than 10 angstrom units in radius. The alumina hydrate particles can be sintered directly to obtain the catalyst base. Alternatively, the hydrate can be calcined to a high area base as in our previous applications, and then sintered to provide a catalyst having substantially no pores of less than 10 angstrom units radius. Calcination without substantial sintering to obtain the high area base can be effected in a flowing gas stream inert to the catalyst base and at temperatures of about 750 to about 1200° F. or more, preferably with a low water vapor partial pressure.

The sintering of the high area calcined base or of the precursor alumina hydrate can be accomplished either thermally or by the combined action of water vapor and elevated temperatures which is referred to as steam sintering. We usually prefer steam sintering over thermal sintering. Generally, the temperature of sintering is in the range from about 750 to about 1200 or 1500° F. or more, while vacuum, atmospheric or elevated pressures can be employed. When thermally sintering we advantageously use higher temperatures than when steam sintering as heat compensates for a decrease in or lack of steam. Regardless of the method employed in sintering the catalyst, it usually contains upwards of about 1% by weight of volatile matter at 1100° C. and if sintered and then cooled with dry gas such volatile matter generally constitutes from about 1.5 to about 5% of the weight of the catalyst.

One method of sintering the alumina hydrate is to contact it at elevated temperature with a heated flowing gas stream. This can be done in an isothermal system, i. e. one in which the temperature of the heated zone is maintained by supplying heat through the walls of the confining vessel as in a rotary kiln. On a commercial scale it may be desirable to employ an adiabatic operation, i. e. one in which substantially no heat is transferred to the catalyst through walls of the sintering vessel. When steam sintering, the flowing gas stream contains a substantial amount of water vapor conveniently provided by saturation of the gas stream with water vapor at ambient temperature or by injection of water in the heated gas stream. Gases which can be employed when sintering are those which are generally considered to be inert to the catalyst base material, for instance, nitrogen, hydrogen, flue gases, air, etc. When employing a free oxygen-containing gas, it is desirable to sinter the base particles quickly so that the possibility of platinum migration is minimized. Thus, a low gas flow rate would be preferred in order to provide a greater quantity of water vapor in the atmosphere to effect quicker sintering. A very high oxygen-containing gas flow rate can be deleterious. As an example, a calcined platinum-alumina catalyst having a surface area of 500 square meters per gram and prepared as described in our said copending applications was sintered slowly in air using an isothermal unit to obtain a catalyst having an area of about 301 square meters per gram and the catalyst had a relatively low activity and life. We believe this was the result of undue platinum migration to the small pores before they were sintered. In this preparation the sintering conditions were 2900 gas volume hourly space velocity and 1150° F. with the catalyst being held for three hours at this temperature.

When using a non-oxidizing atmosphere such as hydrogen, nitrogen, etc., the speed of sintering is not of particular importance except that generally we carry the alumina trihydrate particles directly to the gamma-alumina modifications without passing through an apparent boehmite phase. Accordingly, a gas flow rate of at least about 10 VHSV [volumes of gas per volume of catalyst per hour (STP)] is preferred whether or not the gas stream is of an oxidizing nature, and generally the VHSV will not exceed about 2500. When sintering a previously calcined base the possibility of obtaining this distinct boehmite phase does not exist. Regardless of the method of sintering, the platinum in the sintered catalyst can before use be reduced by separate treatment with flowing hydrogen at an elevated temperature and for a period of several hours, e. g. 900° F. and atmospheric pressure for about 1 to about 12 hours.

In general, we have found that our catalyst performs under the usual conditions of reforming. The light normally liquid hydrocarbon stock to be reformed is contacted with the catalyst in a reaction zone at an elevated temperature within the range of about 750° to about 1000° F. under a total pressure of about 200 to about 1000 p. s. i. g. and a hydrogen partial pressure approximating from about 3 to about 20 moles of hydrogen per mole of hydrocarbon charge stock. The catalyst is conveniently handled in the form of pellets or tablets which are placed in the reaction zone in the form of a fixed bed, although, in finely divided form, the catalyst may be handled in a fluidized reaction system. The charge stock and hydrogen gas stream are preheated to processing temperature in a conventional refinery heater for passage through the reaction zone. Because of the endothermic nature of the reforming reactions, the reaction zone is usually divided into stages and the stream reheated between stages. The reactor effluent is passed through a liquid-gas separating system from which the dry gases which usually approximate upwards of about 70% hydrogen are recovered for recycle. The liquid products then are fractionated in the usual way for recovery of a stabilized gasoline reformate or for recovery of the selected aromatic hydrocarbons.

The optimum processing conditions vary in known ways according to the nature of the feed stock, particularly its naphthene content and boiling range. The conditions selected also must account for the nature of the desired products and for the individual selectivity of the particular catalyst. In high severity reforming, it is advantageous to use the catalyst of this invention at about 900 to 970° F., 100 to 250 p. s. i. g., 4 to 12 mols of hydrogen per mol of feed and 0.5 to 5 weight hourly space velocity. Preferably, in such an operation the catalyst contains about 0.3 to 1.5 weight percent of platinum.

The catalyst can be regenerated by removing carbonaceous materials deposited during the reforming operation. This can be accomplished by contact with a free oxygen-containing gas at a temperature of about 800 to 1200° F. Preferably, the amount of oxygen in the regenerating gas is maintained low to avoid heating the catalyst above about 1000° F.

The present invention will be illustrated further by the following examples which are not to be considered limiting. Throughout this specification the X-ray diffraction analyses reported for the alumina hydrates are obtained for 110–120° C. dried samples.

EXAMPLE I

An uncalcined platinum-alumina reforming catalyst precursor was prepared by the use of relatively pure reagents to avoid excessive contamination. In preparing batch No. 1 of alumina hydrate a solution of 62.5 kgs. of aluminum chloride ($AlCl_3$) in 360 liters of water was made by dissolving chemically pure aluminum in chemically pure hydrochloric acid followed by dilution of the aluminum chloride with the water. The aluminum of this solution was precipitated as alumina hydrate by mixing the aluminum chloride solution with sufficient chemically pure ammonium hydroxide solution to give a pH of about 8.0. The two reagents were mixed in the approximate volume ratio of 1:1 while being charged to a common flow pipe and the formation of a precipitate seemed to occur as the liquid stream was run into a stoneware container. The resulting precipitate was separated on a rotary vacuum filter and washed three times at pH's of 8.15, 8.9 and 8.9, respectively. The following day the precipitate was washed two times at a pH of 9.0. The washed filter cake was maintained at room temperature for 4 days after which it had a composition as determined by X-ray diffraction of about 29 weight percent boehmite, 29 weight percent bayerite, 22 weight percent randomite, 18 weight percent gibbsite and 2 weight percent amorphous. In this analysis method the amount of amorphous material is determined by subtracting the total amount of trihydrate and boehmite from 100. Carbon dioxide was then added, reducing the pH of the cake from about 8.45 to about 6.8 and the addition of the carbon dioxide minimized further aging of the cake. The hydrate was allowed to stand and when 41 days old had the following composition: 17 weight percent boehmite, 34 weight percent bayerite, 29 weight percent randomite, 18 weight percent gibbsite and 2 weight percent amorphous. This material was then slurried with an aqueous chloroplatinic acid solution containing sufficient platinum to yield an ultimate composition of 0.6 percent platinum on an ignited weight basis. Sufficient aqueous hydrogen sulfide solution was added to the slurry to precipitate substantially all of the platinum present. During this time the pH was kept at 6.0 by adding small amounts of ammonium hydroxide. The slurry was then dried by spray drying.

Batch No. 2 of platinum-containing alumina hydrate was prepared in the same manner as batch No. 1. When the washed hydrate filter cake was 4 days old its composition by X-ray diffraction analysis was 34 weight percent boehmite, 33 weight percent bayerite, 16 weight percent randomite, 14 weight percent gibbsite and 3 weight percent amorphous. At this point carbon dioxide was added to minimize further aging and the base was allowed to stand for 28 days. At the end of this period its composition was 25 weight percent boehmite, 36 weight percent bayerite, 19 weight percent randomite, 18 weight percent gibbsite and 2 weight percent amorphous. This material was impregnated with platinum and spray dried as in preparing batch No. 1. Batches Nos. 1 and 2 were then mixed in a V-blender. The resulting powder was combined with water and thoroughly mixed until it had a free water content of about 25 weight percent as determined by a Central Scientific Company Infrared Moisture Meter containing a 125 watt bulb, the meter being identified as Catalog No. 26675. The wet mix was then extruded through a die with holes 1/16" in diameter. The extruded material was dried at 110° C. for 16 hours and then broken into pieces shorter than 1/4" in length.

EXAMPLE II 125 grams of extruded and sized platinum-alumina hydrate particles of Example I were charged to a 44–45 mm. internal diameter Vycor tube which was placed in a radiant furnace (5" internal diameter). The tube, under atmospheric pressure, was purged with nitrogen and heating of the furnace was begun. Hydrogen saturated with water at room temperature was passed through a preheating section of the tube containing alumina balls to bring the gas to furnace temperature and then the wet gas was passed over the platinum-alumina hydrate particles in the tube. The wet hydrogen stream was supplied at the rate of about 52 VHSV (volume of gas per volume of catalyst per hour corrected to STP). In about 1.5 hours after the heating was begun all portions of the catalyst bed had reached about 1100° F., the calcination temperature. During the heating of the catalyst to this temperature, removal of free water from the hydrate particles was effected (dehydration) and substantial calcination was accomplished with removal of most of the water of crystallization, particularly in the first part of the catalyst bed. Calcination at 1100° F. was continued for about 4.5 hours. At this point the heat to the furnace was shut off and the Vycor tube was purged with pre-purified nitrogen for 5 minutes. The tube was withdrawn from the furnace and the calcined catalyst was cooled to room temperature by contact with a flowing pre-purified nitrogen stream. The surface area of the catalyst was 197 square meters per gram and the smallest pores had a radius of about 18.6 angstrom units.

EXAMPLES III TO V

Several additional catalysts were prepared according to the procedure of Example II with the variations noted in Table I which follows:

*Table I*

| Example No. | III | IV | V |
|---|---|---|---|
| Calcination Gas | $N_2$ Saturated With $H_2O$ At Room Temp. | Air Saturated With $H_2O$ at Room Temp. | Air Dried.[1] |
| VHSV of Calcination Gas | 66 | 53 | 50. |
| Approx. Heating Time Required For Entire Bed to Reach 1,100° F., Hours | 2.25 | 3 | 2.25. |
| Time Entire Bed At 1,100° F., Hours | 3.75 | 3 | 3.75. |
| Cooling Gas | Nitrogen | Nitrogen | Nitrogen. |
| Catalyst Volatile Matter at 1,100° C., Wt. percent | 1.87 | 2.38 | |
| Surface Area, Square Meters Per Gram | 210 | 230 | 250. |
| Radius of Smallest Pores, Angstrom Units | 17.7 | 16.5 | 15.2. |

[1] Air dried by passing through a tower containing virgin high area catalyst of our said copending applications.

EXAMPLE VI

A platinum-alumina catalyst 410—H9008 having a surface area of 470 square meters per gram, volatile matter at 1100° C. 4.24% and a platinum content of about 0.6% prepared essentially as set forth in our mentioned applications was sintered to an area of 204 square meters per gram and about 2% volatile matter at 1100° C. in accordance with the following procedure. 120 grams of the catalyst were disposed as a bed 11½" deep in a high pressure reactor, internal diameter about ⅞" and length 36". The reactor was equipped for reactant downflow and contained 20" of tabular alumina above the catalyst bed as a preheat section and 4" of tabular alumina below the catalyst bed as a post heat section. The reactor was heated in a 5" internal diameter radiant furnace. The catalyst was reduced by contact with hydrogen at 925° F. and atmospheric pressure, and the pressure was then allowed to build up to 500 p. s. i. g. for the sintering operation. Hydrogen was passed through the catalyst bed at the rate of 115 liters per hour (STP), 925° F. and 500 p. s. i. g. The hydrogen supplied was saturated with water at room temperature and 500 p. s. i. g. After 144 hours of hydrogen treatment under these conditions, the catalyst had been sintered to an area of 204 square meters per gram and its smallest pores were about 18 angstrom units in radius. The reactor was then purged with dry nitrogen, removed from the furnace and the catalyst was cooled with flowing dry nitrogen to room temperature. 81.53 grams of the catalyst were taken from the middle portion of the bed, and the catalyst was tested as described in Example VII.

EXAMPLE VII

The catalysts prepared according to the procedures of Examples II to VI were tested for activity and life in accelerated tests conducted under reforming conditions. In these runs the feed stock was a Mid-Continent straight run naphtha typically of 245° to 360° F. ASTM distillation boiling point range and analyzing

| | Weight percent |
|---|---|
| Paraffins | 46.7 |
| Olefins | <1 |
| Naphthenes | 44.8 |
| Aromatics | 8.3 |
| RON (neat) | 38 |

The reforming conditions were 940° F., 200 p. s. i. g., 15 WHSV (weight of feed per weight of catalyst per hour), and 5 moles of recycle gas per mole of hydrocarbon feed. The recycle gas was composed of hydrogen and a minor amount of light hydrocarbons. The temperature was brought from 800° to 940° F. over a six hour period with heated naphtha feed being charged under the other conditions of the test. In each test at 940° F. the naphtha was fed under reforming conditions for 48 hours, and a composite of liquid product for each six hour period was collected. The data gathered in the runs were as follows:

| Catalyst of Example | II | III | IV | V | VI |
|---|---|---|---|---|---|
| Composite Liquid Product Octane (RON Neat): | | | | | |
| Initial Period at 940° F | 91.0 | 88.7 | 90.5 | 89.5 | 89.1 |
| Final Period at 940° F | 81.8 | 83.1 | 81.8 | 79.3 | 81.5 |
| Wt. Percent Carbon on Catalyst (Dry Basis) After Test | 5.98 | 7.37 | 7.47 | | 6.08 |
| Initial Gas Make Extrapolated, Cubic Feet Per Barrel of Feed | 1,440 | 1,420 | 1,380 | 1,460 | 1,450 |
| Percent Gas Make Decline Over 48 Hour Test Period | 22 | 23 | 28 | 36 | 24 |

EXAMPLE VIII

A platinum-alumina reforming catalyst was prepared by sintering our alumina hydrate to a low area and then adding the platinum component. In this procedure pure aluminum was dissolved in pure hydrochloride acid and the resulting solution mixed with deionized water to form an aqueous aluminum chloride solution equivalent to approximately 65 grams of $Al_2O_3$ per liter. A separate deionized water solution of $NH_4OH$ was prepared containing sufficient ammonia to give a pH of 8.0 when mixed with the aluminum chloride in a 1:1 ratio. These two reagents in approximate volume ratio of 1:1 were then intimately mixed at a pH of 8.0. The flowing stream was passed to a rubber-lined container and an alumina hydrate was visible. The precipitated hydrate was filtered from the mother liquor and washed to < about 0.2% chloride by successive filtrations and re-slurryings in deionized water at a pH of about 9. The washed hydrate was covered with water in a rubber-lined container and aged at about 90° F. until it contained approximately 95 weight percent trihydrate, the remainder being substantially of the amorphous or monohydrate forms. The aged hydrate composition was dried on a horizontal drum drier to give a powder of generally less than 20 mesh which by X-ray diffraction analyzed 8 weight percent boehmite, 46 weight percent bayerite, 26 weight percent randomite, 14 weight percent gibbsite and 6 weight percent amorphous. The dried material contained 3.4 weight percent free water determined as in Example I. The dried hydrate was calcined in a stainless steel continuous rotary calciner heated externally with gas. The maximum temperature of the calciner was 800° C. and the total residence time of the alumina hydrate in the calciner was about 5 minutes, but only during a portion of this time was the alumina in the hot zone of the calciner. After calcination the alumina base had a water content of 3 percent on an ignited weight basis, a surface area of about 300 square meters per gram and by X-ray determination was completely free of crystalline hydrate phases.

2.01 kgs. of the calcined powder was exposed to the atmosphere and it picked up moisture due to its desiccating properties. The powder was then dried at 110° C. A solution of 11.7 grams of platinum in the form of chloroplatinic acid was added to 467 mls. of water and the mixture was added dropwise to the powder while continuously blending to form an impregnated powder of uniform appearance. After impregnation the water content was adjusted from 15.8 to 34 weight percent. The mix was well agitated and extruded through an auxiliary screw extrusion machine without a die plate to plasticize the material and reduce its moisture content. This operation was repeated and the moisture content of the resulting material was 33 weight percent. The material was extruded through a die having holes 1/16" in diameter and the extrudate was dried for 16 hours at 110° C. The dried extrudate was broken into particles of lengths less than 1/4". The particles were calcined by contact with dry air at a volume space velocity of about 500. During calcination the temperature of the pellets was brought from room temperature to a maximum of 485° C. and held at the maximum temperature for 2 hours. The calcined catalyst had a surface area of 303 square meters per gram as determined by small angle X-ray scattering techniques and a volatile matter at 1100° C. of 1.3 weight percent.

The catalyst was tested for Mid-Continent naphtha reforming activity and aging stability according to the procedure set forth in Example VII and the resulting composite liquid product from the initial period at 940° F. had an octane (RON neat) of 89.2, while the composite liquid product from the final period had an octane (RON neat) of 78.2. The initial gas make (extrapolated) was 1400 cubic feet per barrel of feed and the percent gas make decline over the 48 hour test period was 35.

EXAMPLE IX

To illustrate the regenerability of our present catalyst, 4.2 gms. (about 6 ccs.) of the catalyst of Example II were mixed with 4 to 8 mesh tabular alumina and disposed in a reaction zone in five separate vertically spaced beds, each containing 50 ccs. of the mixture. The catalyst distribution in the separate beds was as follows:

| Bed | Catalyst, cc. | 4 to 8 Mesh Alumina, cc. |
| --- | --- | --- |
| 1 | 0.6 | 49.4 |
| 2 | 1.0 | 49.0 |
| 3 | 1.0 | 49.0 |
| 4 | 1.2 | 48.8 |
| 5 | 2.3 | 47.7 |

The catalyst was reduced by contact with hydrogen for 2 hours at 900° F.

A Mid-Continent naphtha reforming feed was processed by contact with these beds under accelerating aging conditions. Feed stock had a boiling range of about 219 to 368° F. contained 47.1 volume percent paraffins, 45.1 volume percent naphthenes and 7.8 volume percent aromatics and had a research octane number neat of 39.0. Processing continued for 16 hours at 940° F., 44 WHSV, 200 p. s. i. g., and 3:1 molal recycle gas to feed ratio. Sulfur was removed from the recycle gases. The resulting product reformate was flashed to 60° F. at atmospheric pressure to obtain a weathered liquid product. The feed was then stopped and the recycling of gases continued for 1 hour. The reactor was depressured and then purged for 5 minutes with nitrogen to remove recycle gases while the temperature was held at 940° F. Then contact of the catalyst with regeneration gas was begun. The regeneration gas was dried by contact with Drierite and was composed of nitrogen and air in amounts sufficient to provide a mixture containing approximately 0.35 mole percent of oxygen. The conditions of regenerating gas contact were 940° F. and 400 p. s. i. g. and the gas was supplied at the rate of 20 cubic feet per hour measured at room temperature and atmospheric pressure. The regeneration was continued until there was no carbon dioxide detected in the off-gases after they had been combusted in a carbon monoxide burner. During regeneration the temperature did not go above about 960° F. and at the end of the regenerating period the temperature was 940° F.

Following regeneration the vessel was depressured and then purged with nitrogen to remove regenerating gas. Hydrogen flow over the catalyst was started at atmospheric pressure and at the rate of 6 cubic feet per hour. The temperature of the catalyst was dropped from 940 to 900° F. and held 2 hours. The temperature was again raised to 940° F. and recycle of hydrogen-containing gases was started to bring the pressure to 200 lbs. The feeding of the charge naphtha was begun under the original processing conditions.

This operation was repeated to provide a total of 13 processing cycles, and the approximate initial and final octanes of the weathered reformate are summarized in Table II below. Also in this table are data obtained under similar conditions of processing and reformation over 12 processing cycles using a commercial sample of the catalyst of our said copending applications referred to in the table as catalyst X. This catalyst had initial surface area of 507 square meters per gram and a platinum content of about 0.6 weight percent.

Table II

| Processing Cycle | Approximate Octanes (RON neat), Catalyst of Ex. II | | Approximate Octanes (RON neat), Catalyst X | |
| --- | --- | --- | --- | --- |
| | Initial | Final | Initial | Final |
| 1 | 82 | 69 | 79 | 66 |
| 3 | 74 | 57 | 75 | 54 |
| 6 | 77 | 60 | 71 | 49 |
| 9 | 73 | 58 | 62 | 40 |
| 12 | 67 | 47 | 66 | 47 |
| 13 | 65 | 48 | | |

The initial and final octanes were determined by plotting measured octanes of weathered liquid samples obtained at four intervals of each 16-hour processing cycle. These data show that the catalyst of Example II had a substantially lower aging rate than catalyst X.

Data in Table III relating to the strength obtained of the catalyst of Example II and catalyst X after the cyclic processing show that the catalyst of the present invention is less susceptible to loss in strength during processing regeneration.

Table III

| | Catalyst X | | Catalyst, Ex. II | |
| --- | --- | --- | --- | --- |
| | Virgin | Used | Virgin | Used |
| Catalyst crushing strength, pounds | 13.6 | 4.6 | 12.4 | 7.7 |

Thus, after multiple processing and regenerating cycles the final strength of our present catalyst was over 160% of that of catalyst X.

What is claimed is:

1. A catalyst having reforming activity and essentially comprising calcined alumina and a platinum metal having reforming activity, which catalyst is characterized by large pore base structure essentially composed of gamma-alumina modifications resulting from the drying and calcination of a mixture of precursor hydrous alumina phases containing from about 65 to about 95% of trihydrate, said catalyst containing from about 0.1% to about 1.5% by weight of a platinum metal, said platinum metal being present in sufficiently finely divided form as to exhibit by X-ray diffraction studies, the substantial absence of crystallites and crystals of size larger than about 50 angstrom units, the conditions of calcining serving to sinter the catalyst so that after calcining and before use it has substantially no pores smaller than about 10 angstrom units radius and a surface area of less than about 350 square meters per gram.

2. A catalyst as in claim 1 in which the platinum metal is platinum.

3. The process of reforming light hydrocargon stocks to produce gasoline, benzene and other selected aromatics, which comprises contacting the hydrocarbon stock under reforming conditions of temperature, pressure and hydrogen partial pressure with a reforming catalyst as defined in claim 1.

4. The process of reforming light hydrocarbon stocks to produce gasoline, benzene and other selected aromatics, which comprises contacting the hydrocarbon stock under reforming conditions of temperature, pressure and hydrogen partial pressure with a reforming catalyst as defined in claim 2.

References Cited in the file of this patent

UNITED STATES PATENTS

| | | |
|---|---|---|
| 2,681,304 | Blanding et al. | June 15, 1954 |
| 2,761,819 | Dinwiddie | Sept. 4, 1956 |
| 2,763,623 | Haensel | Sept. 18, 1956 |